Dec. 25, 1956  B. LEFF  2,775,040
THREE DIMENSIONAL PELVIMETER
Filed Sept. 4, 1952  3 Sheets-Sheet 1
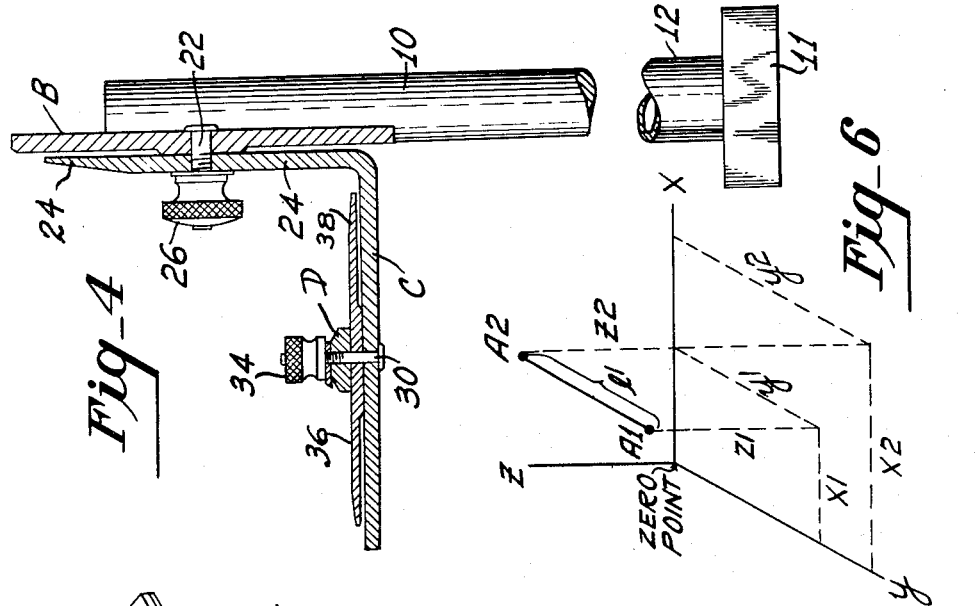
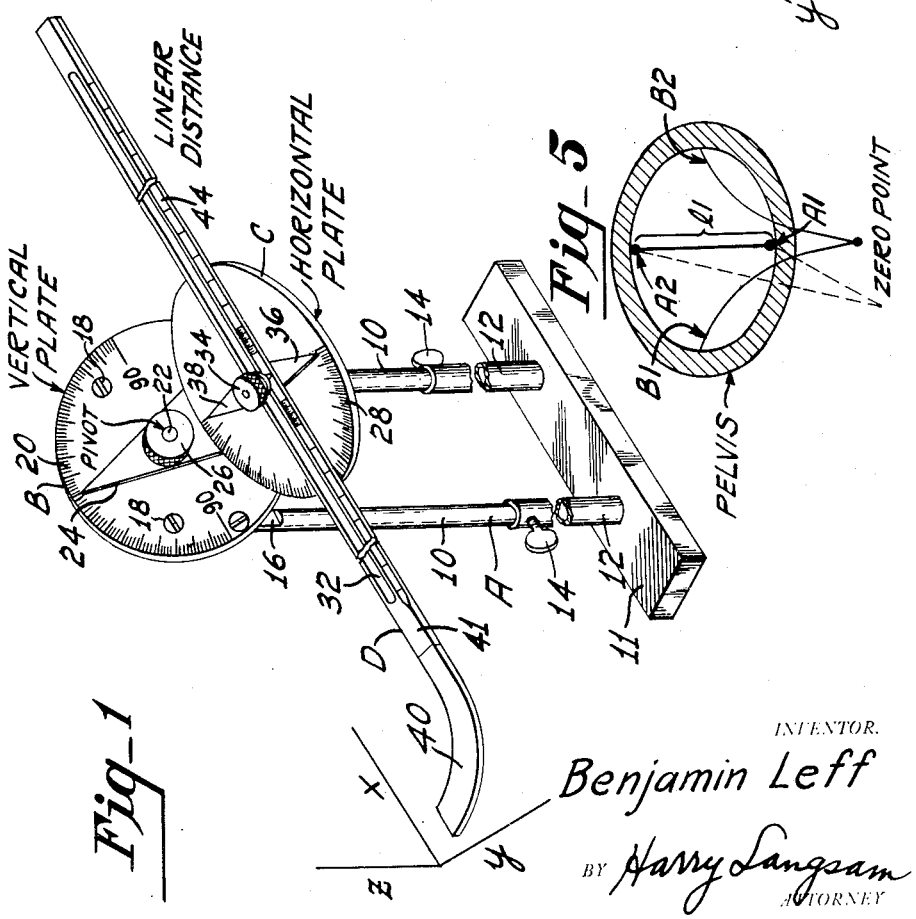
INVENTOR.
Benjamin Leff
BY Harry Langsam
ATTORNEY

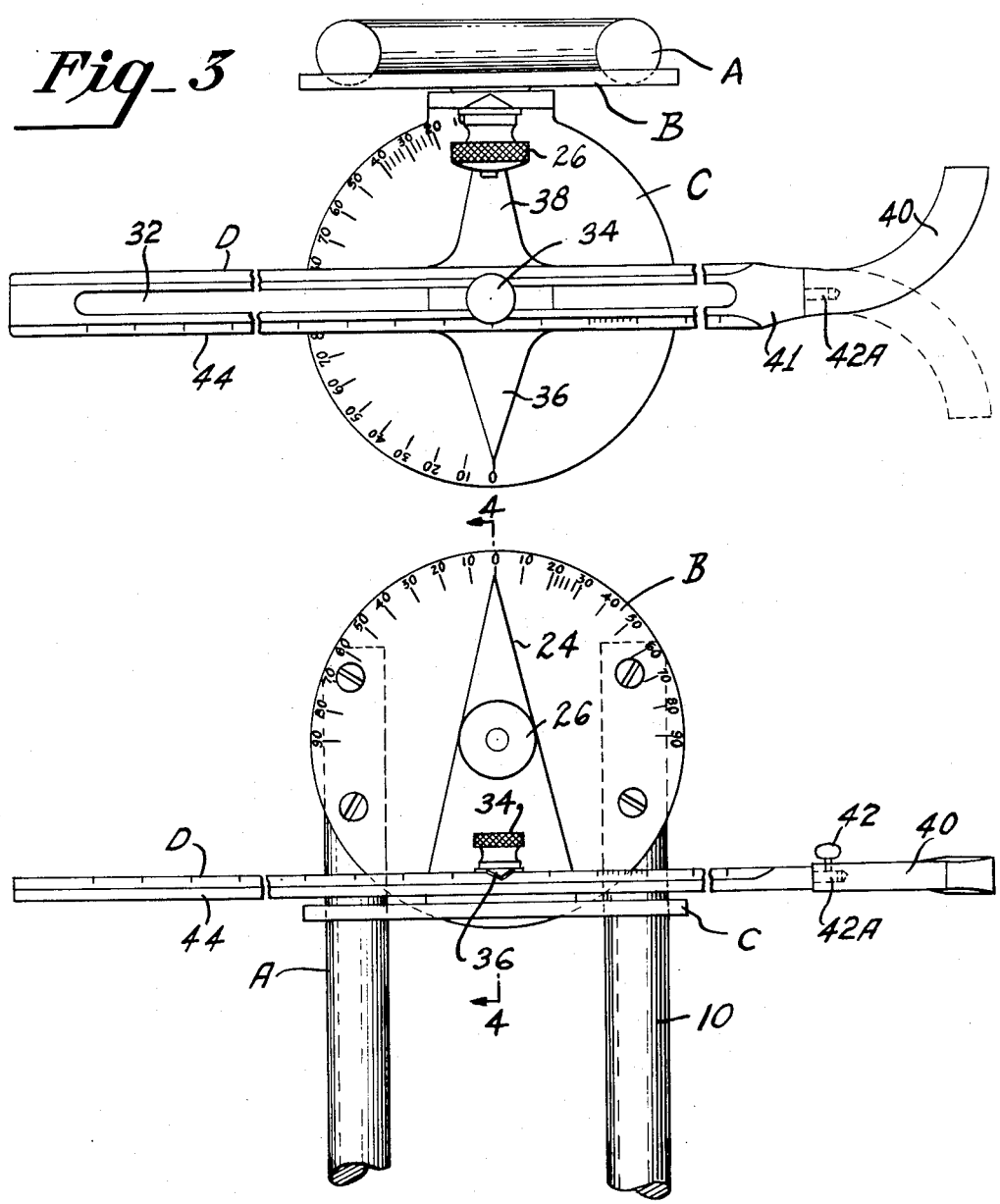

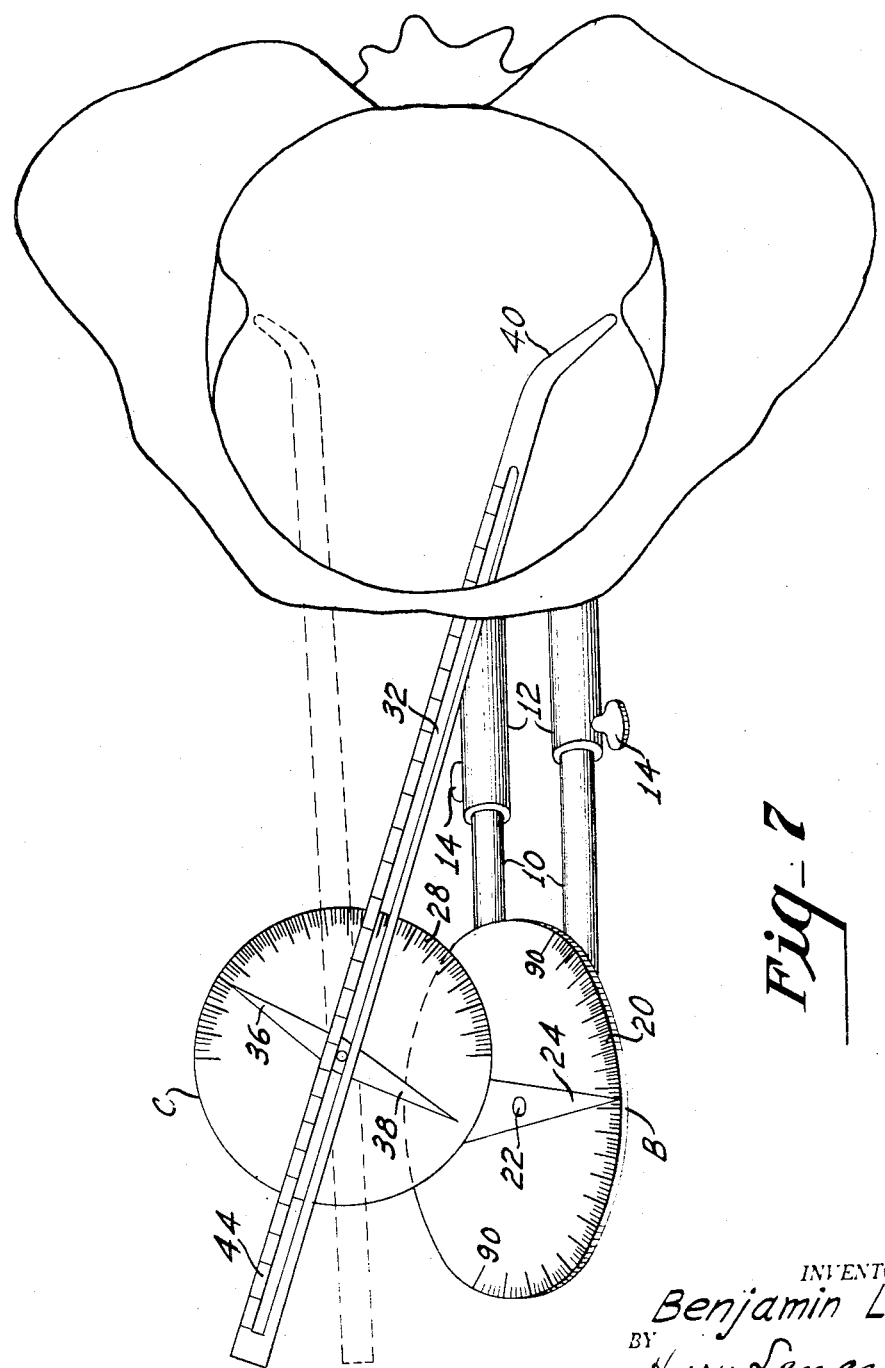

United States Patent Office 2,775,040
Patented Dec. 25, 1956

2,775,040

THREE DIMENSIONAL PELVIMETER

Benjamin Leff, Philadelphia, Pa.

Application September 4, 1952, Serial No. 307,830

3 Claims. (Cl. 33—174)

This invention relates to a pelvimeter for measuring the dimensions of a female pelvis and it particularly relates to a pelvimeter which is adapted to give a three dimensional measurement.

The size of the pelvic opening is of extreme importance in the case of an expectant mother because it is necessary that it be of sufficient size to enable the body to pass through during delivery. If it is not large enough, then the mother must undergo a Caesarean section. It is, therefore, of extreme importance that these measurements be as accurate as possible. Instruments available for pelvic measurements are inadequate and inaccurate. This is particularly so in internal pelvimetry. It is the internal diameters that are most important the results of these internal measurements by means of existing pelvimeters are most incomplete and inaccurate. There is no single instrument made that will take any and all pelvic diameters both internal and external. All attempts heretofore, at instrumental pelvic mensuration has been done on the basis of measuring diameters in single planes whereas, the pelvis is a three dimensional figure.

It is an object of my invention, therefore, to provide an instrument for the internal measurement of expectant mothers which gives an accurate and complete measurement.

Another object of my invention is to provide an instrument for internal measurement which is safe and easy to use and which causes a minimum of physical discomfort and pain to the patient.

Another object of my invention is to provide an instrument for internal measurement which allows the actual measurement of the diameter to be plotted or calculated outside of the body.

Another object of my invention is to provide an instrument for accurately measuring all and any diameters both internally and externally in three dimensions.

Another object of my invention is to provide an examining physician with a quick and accurate determination of the relative dimensions of the human pelvis.

Other objects of my invention are to provide an improved device of the character described, that is easily and economically produced, which is sturdy in construction, and which is highly efficient in operation.

With the above related objects in view, my invention consists in the details of construction and combination of parts, as will be more fully understood from the following description, when read in conjunction with the accompanying drawings in which:

Fig. 1 is a perspective view of a three-dimensional pelvimeter embodying my invention.

Fig. 2 is a side elevational view of my pelvimeter.

Fig. 3 is a plan view of my pelvimeter.

Fig. 4 is a sectional view of the dials taken along the line 4—4 of Fig. 2.

Fig. 5 is a pelvic section wherein the linear distance between any two points is sought.

Fig. 6 schematically illustrates the physical finding of the distance between any two points within the pelvic region.

Fig. 7 is a fragmentary view showing the application of my invention in measuring the internal diameter of the pelvis.

Referring now in greater detail to the drawings wherein similar reference characters refer to similar parts, I show a three-dimensional pelvimeter comprising a support, generally designated as A, having two parallel legs 10 which telescope into individual support members 12 which are provided with suitable base 11, for holding the members 12 upright on a table, on the floor, or on any other suitable surface. A set screw 14 is provided in each member 12 for the purpose of locking the members 10 in any position of vertical adjustment desired.

A groove 16 is provided at the top of each leg 10 and secured across the faces of the grooves is a vertically located dial, generally designated as B. Screws 18 connect the dial B to the groove faces. A calibrated scale 20 is provided on one face of the vertical dial B adjacent its periphery. The calibration on the dial is from 0 to 90°, the zero mark being the vertical position.

Centrally located within the dial B is a perforation through which a bolt 22 passes; the bolt serves as a bearing about which a pointer 24 revolves. Connected to the face of the dial B by means of the bolt 22 is the pointer 24 which is part of a horizontally located dial, generally designated as C, the pointer being set at a 90° angle to the dial B. A nut 26 holds the pointer 24 fastened on the bolt 22.

The horizontally located dial C has a scale 28 calibrated in degrees on its upper face adjacent the periphery thereof, and also is provided with a bolt 30 centrally positioned therethrough. An elongated linear distance measuring rod or pointer, generally designated as D, having a central longitudinal slot 32 therein is adjustably connected to the dial C by means of the bolt 30 passing through a slot 32. A nut 34 holds the rod D in its position relative to the dial C. The linear measuring rod D is mounted upon a pair of oppositely extending pointers 36 and 38, these pointers and the rod D are adapted to rotate in unison and pivot at the center and over the calibrated face of the dial C. The pointers 36 and 38 are integral with one another and provided thereon are a pair of oppositely positioned upstanding flanges 37 and 39 spaced from each other to form a channel. It is this channel that enables the linear measuring rod D to slide relative to the pointers 36 and 38 while, at the same time, the rod and the pointers are adapted to rotate together on bolt 30. A detachable tip 40 is provided at one end of the linear measuring rod, the tip being curved laterally to the slotted face of the rod. The tip 40 may be straight or curved and is rotatably adjustable on the rod D. A set screw 42 holds the tip in its adjusted position on the projection 42A. A calibrated linear scale 44 is formed on the upper face of the rod D at each edge.

In operation, the patient lies on a table or the like and the instrument is set at an angle to the patient. The nuts 26 and 34 are then loosened and the rod D is inserted into the vaginal opening, first with the tip 40 facing in one direction, the readings are taken and then with the tip facing the opposite direction and the readings are taken. With the first insertion, the rod is manipulated so that the tip 40 contacts any landmark or palpable point (as point A1 in Fig. 5) in the pelvis. The vertical manipulation of the pointer D takes place through the pivotal movement of the dial C around the bolt 22 and the pointer 24 gives the reading on the vertical plate B. The horizontal reading takes place through the linear distance and angular position of the pointer D relative to the bolt 30 on the dial C.

When the proper contact (determined by the experience of the physician) has been made by the tip 40 of the pelvimeter, the nuts 26 and 34 are tightened. The readings taken are the positions of the landmark or palpable points with respect to a zero point. The linear distance $l1$ (Fig. 5) between the landmark or palpable point readings taken and the pivot point of the pointer is indicated on the linear scale of the rod.

The operation of the device is as follows: to locate an unseen point in space with respect to a known point of origin, the rod D is inserted with the tip 40 turned so that its end abuts against point A1 as shown in Fig. 5. The three-dimensional coordinates of point A1 are obtained by taking any arbitrary fixed point in space which is located outside of the vaginal opening and, with this point as the origin, determining the horizontal angle between the origin and point A1 in the X—Y plane and also its position in the vertical or Z plane. The horizontal angle is determined by rotating the rod D and pointers 36—38 around the dial C. The vertical angle in the Z plane is read on the dial B but is determined by the location of the rod on the point A1. This provides the angular location of the point A1 with respect to the horizontal and vertical angles, but it does not determine the points A1 until the linear distance is read on the rod D. To locate the position of the point A1 in space, the linear distance on the rod D is read. The linear distance is physically determined by adjusting the rod D linearly by means of sliding the rod relative to bolt 30.

With the readings taken on (1) the dial B, (2) the dial C, (3) and the linear distance, the unseen point A1 is located in space definitely with respect to the fixed point of origin.

The location of point A2 is determined similarly to point A1.

The two points A1 and A2, therefore, are now definitely located since their respective distances from the origin, as indicated in broken lines in Fig. 5 are known, and since the angle that each of these broken lines makes between the origin and their respective points A1 or A2 is known. The angle at the origin between these broken lines, representing the distances between the origin and points A1 and A2, therefore, can be determined.

There is now provided a triangle illustrated in Fig. 5 by the two broken lines and the line $l1$ between A1 and A2. In this triangle, the two sides, represented by the broken lines, are now known, and the angle between them is now known. The third side $l1$ of the triangle, therefore, can be simply determined mathematically. Alternately, the sides represented by the broken lines and angle between them can be physically measured off and then, the distance between their ends, as represented by line $l1$ can be physically measured.

It is, therefore, seen that by a simple method of triangulation, the actual size of the pelvic opening is accurately measured quickly and with a minimum of delving and probing.

Although my invention has been described in considerable detail, such description is intended as being illustrative rather than limiting, since the invention may be variously embodied, and the scope of the invention is to be determined as claimed.

I claim as my invention.

1. A device to measure the pelvic opening of an expectant mother wherein unseen distances are located beyond an obstruction comprising a support externally located of said opening, a calibrated plate mounted upon said support and lying in a vertical plane, a pivoted dial pointer mounted upon said calibrated plate, a second calibrated plate attached at right angles to said first named pointer, a second pointer pivotally mounted upon and complementary to said second plate, a rod slidable with respect to said second pointer and being slidable only along its longitudinal axis, means for holding said second pointer and said rod to rotate together, and a tip extending laterally on one end of said rod which tip is adjustable to engage different unseen points within said unseen pelvic opening.

2. A device to measure the pelvic opening of an expectant mother wherein unseen distances are located beyond an obstruction comprising a support externally located of said opening, a calibrated plate mounted upon said support and lying in a vertical plane, a pivoted dial pointer mounted upon said calibrated plate, a second calibrated plate attached at right angles to said first named pointer, a second pointer pivotally mounted upon and complementary to said second plate, a rod slidable with respect to said second pointer and being slidable only along its longitudinal axis, said rod is slidable in a plane parallel to said second plate, means for holding said pointer and said rod to rotate together, and a tip extending laterally on one end of said rod which tip is adjustable to engage different unseen points within said unseen pelvic opening.

3. A device to measure the pelvic opening of an expectant mother wherein unseen distances are located beyond an obstruction comprising a support externally located of said opening, a calibrated plate mounted upon said support and lying in a vertical plane, a pivoted dial pointer mounted upon said calibrated plate, a second calibrated plate attached at right angles to said first named pointer, a second pointer pivotally mounted upon and complementary to said second plate, a rod slidable with respect to said second pointer and being slidable only along its longitudinal axis, said rod being slidable in a plane parallel to said second plate, means for holding said second pointer and said rod to rotate together, and a tip pivotally mounted upon said rod and extending laterally on one end of said rod which tip is adjustable to engage different unseen points within said unseen pelvic opening.

References Cited in the file of this patent

UNITED STATES PATENTS

| | | |
|---|---|---|
| 1,296,643 | Fish | Mar. 11, 1919 |
| 1,526,619 | Williams | Feb. 17, 1925 |
| 1,540,462 | Destombes | June 2, 1925 |
| 1,753,965 | Ralph | Apr. 8, 1930 |
| 2,095,059 | Donnelly | Oct. 5, 1937 |
| 2,453,863 | Salisbury | Nov. 16, 1948 |
| 2,563,599 | Gardner | Aug. 7, 1951 |

OTHER REFERENCES

Plane Surveying, Tracy, John Wiley and Sons, 1913, p. 222 (3rd Method).